United States Patent
Ding et al.

(10) Patent No.: US 9,811,208 B2
(45) Date of Patent: Nov. 7, 2017

(54) TOUCH SCREEN AND METHOD OF DETERMINING A TOUCH POSITION

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Haisheng Wang, Beijing (CN); Yingming Liu, Beijing (CN); Shengji Yang, Beijing (CN); Tao Ren, Beijing (CN); Wei Liu, Beijing (CN)

(73) Assignees: BOE TECHNOLOGY GROUP CO., LTD. (CN); BEIJING BOE OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 15/325,245

(22) PCT Filed: Sep. 24, 2015

(86) PCT No.: PCT/CN2015/090498
§ 371 (c)(1),
(2) Date: Jan. 10, 2017

(87) PCT Pub. No.: WO2016/123990
PCT Pub. Date: Aug. 11, 2016

(65) Prior Publication Data
US 2017/0185225 A1  Jun. 29, 2017

(30) Foreign Application Priority Data
Feb. 2, 2015  (CN) .......................... 2015 1 0053295

(51) Int. Cl.
G06F 3/045 (2006.01)
G06F 3/041 (2006.01)
(Continued)

(52) U.S. Cl.
CPC ........ G06F 3/0418 (2013.01); G02F 1/13338 (2013.01); G02F 1/13439 (2013.01);
(Continued)

(58) Field of Classification Search
CPC ...... G06F 3/0418; G06F 3/0412; G06F 3/044; G06F 2201/121; G06F 2203/04104;
(Continued)

(56) References Cited

U.S. PATENT DOCUMENTS

2010/0328262 A1  12/2010  Huang et al.
2014/0253481 A1  9/2014  Kim et al.
(Continued)

FOREIGN PATENT DOCUMENTS

CN  103049157 A  4/2013
CN  103970392 A  8/2014
(Continued)

OTHER PUBLICATIONS

First Office Action for Chinese Application No. 201510053295.3, dated Feb. 20, 2017, 6 Pages.
(Continued)

Primary Examiner — Adam R Giesy
(74) Attorney, Agent, or Firm — Brooks Kushman P.C.

(57) ABSTRACT

The present disclosure discloses a touch screen and a method of determining a touch position. The touch screen includes: a plurality of first touch electrodes; and a plurality of horizontal scanning lines, each of the plurality of horizontal scanning line connecting the first touch electrodes in a same row.

14 Claims, 3 Drawing Sheets

(51) Int. Cl.
*G06F 3/044* (2006.01)
*G02F 1/1333* (2006.01)
*G02F 1/1335* (2006.01)
*G02F 1/1343* (2006.01)

(52) U.S. Cl.
CPC .. *G02F 1/133512* (2013.01); *G02F 1/133514* (2013.01); *G02F 1/134336* (2013.01); *G06F 3/044* (2013.01); *G06F 3/0412* (2013.01); *G02F 2201/121* (2013.01); *G06F 2203/04104* (2013.01)

(58) Field of Classification Search
CPC ............. G02F 1/134336; G02F 1/1338; G02F 1/133512; G02F 1/133514; G02F 1/13439
See application file for complete search history.

(56) References Cited

U.S. PATENT DOCUMENTS

| | | | |
|---|---|---|---|
| 2016/0098113 A1 | 4/2016 | Ding et al. | |
| 2016/0246432 A1* | 8/2016 | Hong | ................. G06F 3/0412 |
| 2016/0306457 A1 | 10/2016 | Ding et al. | |

FOREIGN PATENT DOCUMENTS

| | | |
|---|---|---|
| CN | 104331210 A | 2/2015 |
| CN | 104571769 A | 4/2015 |

OTHER PUBLICATIONS

International Search Report and Written Opinion for Application No. PCT/CN2015/090498, dated Dec. 28, 2015, 2 Pages.

* cited by examiner

TOUCH SCREEN AND METHOD OF DETERMINING A TOUCH POSITION

CROSS-REFERENCE TO RELATED APPLICATIONS

This application is the U.S. national phase of PCT Application No. PCT/CN2015/090498 filed on Sep. 24, 2015, which claims priority to Chinese Patent Application No. 201510053295.3 filed on Feb. 2, 2015, the disclosures of which are incorporated in their entirety by reference herein.

TECHNICAL FIELD

The present disclosure relates to the field of liquid crystal display technology, and in particularly to a touch screen and a method of determining a touch position.

BACKGROUND

Since self-capacitive touch screens have advantageous such as large signal capacity and strong anti-noise ability, the self-capacitance approach is mostly adopt to achieve the In-Cell technology (i.e., embedding the function of touch panels into liquid crystal pixels). However, the number of electrodes of the self-capacitive touch screen is very large. For example, in the event of a 5 mm by 5 mm pitch, a 5-inch Liquid Crystal Display (LCD) requires 264 pads, and each of the pads is connected to the integrated circuit (IC) of the display driver using a lead, and thus the number of the leads is large. If the pitch is designed to be smaller for more accurate touch control, more leads are required to be separately led out and the touch panel bezel design is inevitably constrained, making it difficult to achieve a narrow bezel design.

In summary, the self-capacitive touch screens are used in the related art to realize the In-Cell technology, each pad requires a separately led-out lead, and the number of the leads is large. As a result, the bezels of the touch screens are bound to be constrained, which is not conducive to the realization of narrow bezel designs.

SUMMARY

The present disclosure provides a touch screen and a method of determining a touch position, so as to reduce the lead number of the touch screen, thereby achieving the narrow bezel design.

The present disclosure provides a touch screen, including: a plurality of first touch electrodes; and a plurality of horizontal scanning lines. Each of the plurality of horizontal scanning lines is connected to the first touch electrodes in a same row.

In the touch screen provided by the embodiment of the present disclosure, the number of leads led out from the touch screen is reduced by connecting the touch electrodes in a row by a corresponding one of the horizontal scanning lines. Compared with the related art in which a separate electrode line is led out for each pad, the number of the leads led out from the touch screen is reduced, and a narrow bezel design can be easily achieved.

Optionally, in the touch screen provided by the present disclosure, two adjacent horizontal scanning lines are connected to the first ouch electrodes in different directions.

In the touch screen provided by the embodiment of the present disclosure, the number of the leads led out from each bezel of the touch screen is reduced by leading out the two adjacent horizontal scanning lines in different directions, e.g., the left and right sides of the touch screen, further reducing the width of the bezel of the touch screen.

Optionally, the touch screen provided by the present disclosure further includes: a plurality of second touch electrodes; and a plurality of vertical scanning lines, and the second touch electrodes and columns of the first touch electrodes are arranged alternately in a row direction.

Optionally, the touch screen provided by the present disclosure, the plurality of first touch electrodes are block electrodes, and there are multiple first touch electrodes in one column, and the plurality of second touch electrodes are strip electrodes, and there is one second touch electrode in one column.

Optionally, a length of the first touch electrode is equal to a pre-defined pitch, and a width of the first touch electrode is half of the pre-defined pitch.

Optionally, a width of the second touch electrode is equal to a width of the first touch electrode.

In the touch screen provided by the present disclosure, the width of the first touch electrode is set to be half of the defined pitch so that it is possible to detect minor finger touches, achieving more accurate touch positioning. The second touch electrodes are strip electrodes, which is favorable for improving the linearity of touch detection.

Optionally, in the touch screen provided by the present disclosure, the two adjacent second touch electrodes are connected with a same vertical scanning line, and each second touch electrode is connected with one vertical scanning line.

In the touch screen provided by the present disclosure, the number of leads required to be led out is further reduced by connecting the second touch electrodes in two adjacent columns to the same vertical scanning line, and thus a narrow bezel design can be easily achieved.

Optionally, in the touch screen provided by the present disclosure, the plurality of first touch electrodes and the plurality of second touch electrodes are arranged on a common electrode layer.

Optionally, in the touch screen provided by the present disclosure, the plurality of first touch electrodes and the plurality of second touch electrodes are arranged on a color filter substrate.

Optionally, in the touch screen provided by the present disclosure, the plurality of first touch electrodes are arranged on a common electrode layer, and the plurality of second touch electrodes are arranged on a color filter substrate; or the plurality of first touch electrodes are arranged on the color filter substrate, and the plurality of second touch electrodes are arranged on the common electrode layer.

Optionally, when the plurality of first touch electrodes is arranged on the common electrode layer, the plurality of first touch electrodes is reused as a common electrode; or when the plurality of second touch electrodes is arranged on the common electrode layer, the plurality of second touch electrodes is reused as a common electrode.

Optionally, the touch screen provided by the present disclosure further includes: a plurality of electrode lines, each of the plurality of electrode lines corresponding to the first touch electrodes in one column, wherein each electrode line corresponding to the first touch electrodes in one column includes a first sub-electrode line and a second sub-electrode line connected with each other, and the first sub-electrode line and the second sub-electrode line are arranged in a column direction at opposite sides of each first touch electrode and form a mutual capacitor with the first touch electrodes when a touch operation has been made.

In the touch screen provided by the present disclosure, electrode lines are provided, and thus in a multi-touch, the electrode lines form a mutual capacitor with the first touch electrodes, and the horizontal coordinates of the touch positions are preliminarily determined using the electrode lines, so that the touch positions of the multi-touch are determined and ghost points are eliminated.

Optionally, in the touch screen provided by the present disclosure, the plurality of electrode lines is arranged on a color filter substrate.

Optionally, in the touch screen provided by the present disclosure, the plurality of electrode lines is arranged on a source/drain layer, and in a same direction as source and drain electrodes.

The present disclosure further provides in some embodiments a method of determining a touch position in the touch screen provided by the embodiment of the present disclosure, including: applying a driving signal to the plurality of horizontal scanning lines sequentially, and determining a vertical coordinate corresponding to one of the plurality of horizontal scanning lines as a vertical coordinate of the touch position in the case that a signal received by the one of the plurality of horizontal scanning lines meets a first pre-defined condition; and determining a horizontal coordinate corresponding to one of the plurality of electrode lines as a horizontal coordinate of the touch position preliminarily, in the case that the one of the plurality of electrode lines has received an induction signal; applying a driving signal to the plurality of vertical scanning lines sequentially, and determining a horizontal coordinate corresponding to one of the plurality of vertical scanning lines as the horizontal coordinate of the touch position in the case that a signal received by the one of the plurality of vertical scanning lines meets a second pre-defined condition; and determining the touch position based on the horizontal coordinate of the touch position, the vertical coordinate of the touch position and the preliminarily determined horizontal position of the touch position.

In the method provided by the embodiment of the present disclosure, when applying the driving signal to the horizontal scanning lines sequentially, the horizontal scanning lines and the electrode lines synchronously receive signals. The vertical coordinate of the touch position is determined based on the signal received by the horizontal scanning line, and the horizontal coordinate of the touch position is determined based on the sensing signal received by the electrode line. Then, the driving signal is sequentially applied to the vertical scanning lines, and the horizontal coordinate of the touch position is determined by the signal received by the vertical scanning line, and the touch position is determined based on the horizontal and vertical coordinates of the touch position and the preliminarily determined horizontal coordinate. The horizontal coordinate of the touch position is preliminarily determined by the mutual capacitor formed by the electrode line and the first touch electrode, thereby eliminating ghost points in the event of multi-touches. Although the detection of the mutual capacitance is added, there is no increase in the detection time caused by sequentially detecting the self-capacitance and the mutual capacitance. In contrast to sequentially detecting the self-capacitance and the mutual capacitance in the self-capacitor and mutual capacitor integrated touch screen in the related art, the detection of the self-capacitance and the detection of the mutual capacitance are synchronously performed, thereby reducing the detection time of the touch position.

Optionally, in the method provided by the embodiment of the present disclosure, for the first pre-defined condition, a delay time of the signal received by the one of the plurality of horizontal scanning lines is greater than a first preset threshold, and a value of the signal received by the one of the plurality of horizontal scanning lines is smaller than a second preset threshold, and for the second pre-defined condition, a delay time of the signal received by the one of the plurality of vertical scanning lines is greater than a third preset threshold, and a value of the signal received by the one of the plurality of vertical scanning lines is smaller than a fourth preset threshold.

DETAILED DESCRIPTION

Figure 1:
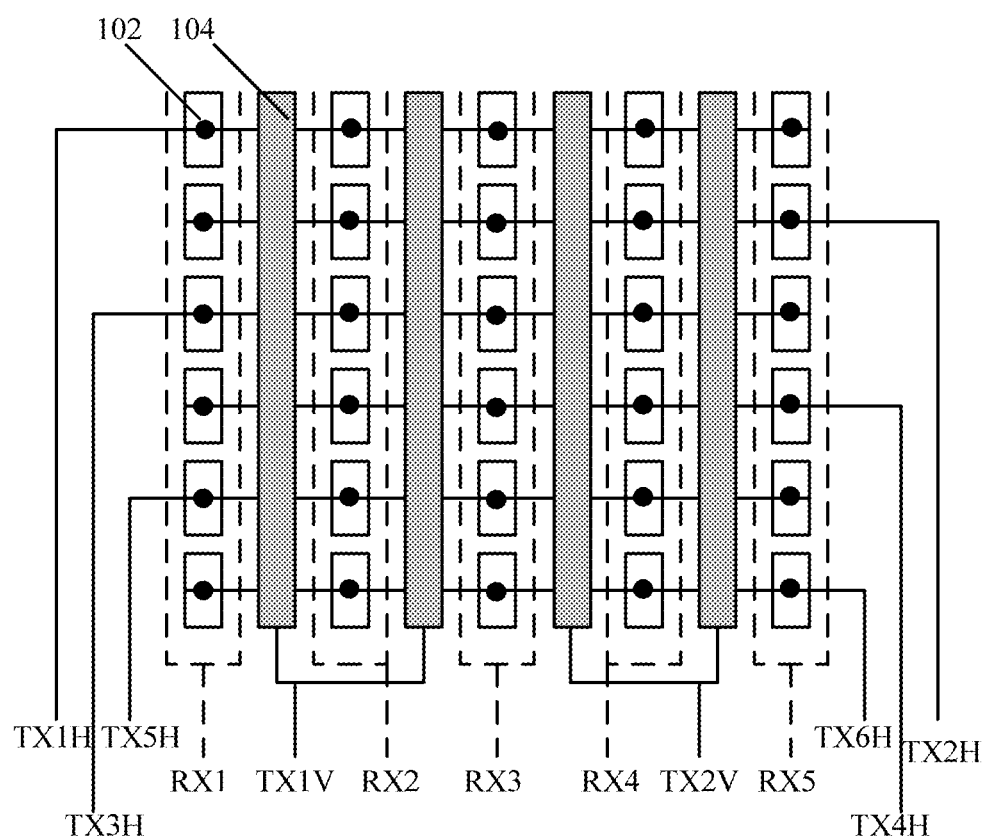
FIG. 1 illustrates a schematic diagram of a touch screen provided by an embodiment of the present disclosure.

Embodiments of the touch screen and the method of determining the touch position provided by the present disclosure will be specifically described in conjunction with accompanying drawings.

The touch screen provided by an embodiment of the present disclosure includes: a plurality of touch electrodes and a plurality of horizontal scanning lines. Each of the horizontal scanning lines connects the touch electrodes in the same row.

In the touch screen provided by an embodiment of the present disclosure, the number of leads required to be led out for the touch screen is reduced by connecting the touch electrodes in a row by a corresponding one of the horizontal scanning lines. Compared with the related art in which a separate electrode line is led out for each pad, the number of the leads led out from the touch screen is reduced, and a narrow bezel design can be easily achieved.

Optionally, in the touch screen provided by an embodiment of the present disclosure, two adjacent horizontal scanning lines are led out in different directions.

In some embodiments, the number of the leads led out from each bezel of the touch screen is reduced by leading out the horizontal scanning lines in two adjacent rows in different directions, e.g., the left and right sides of the touch screen, further reducing the width of the bezel of the touch screen.

Optionally, in the touch screen provided by the embodiment of the present disclosure, the above-mentioned touch electrodes are first touch electrodes, and the touch screen further includes a plurality of second touch electrodes and vertical scanning lines connected with the second touch electrodes. The second touch electrodes and columns of the first touch electrodes are arranged alternately in a row direction.

It should be noted that the first and second touch electrodes may be block electrodes. However, as a preferred embodiment, in order to further decrease the leads, the first touch electrodes are block electrodes, and there are multiple first touch electrodes in one column. A length of the first touch electrode is equal to a defined pitch, and a width of the first touch electrode is half of the defined pitch. The second touch electrodes are strip electrodes, and there is one second touch electrode in one column.

In some embodiments, the width of the first touch electrode is set to be half of the defined pitch so that it is possible to detect minor finger touches, achieving more accurate touch positioning. The second touch electrodes are strip electrodes, which is favorable for improving the linearity of the touch detection.

It should be noted that in some embodiments, the width of the second touch electrode is the same as that of the first touch electrode, both of which is half of the defined pitch, and the second touch electrodes are not connected with the horizontal scanning lines. The pitch is the straight-line distance between the center points of adjacent touch electrodes. As a specific embodiment, for example, the pitch is 5 mm by 5 mm and the defined pitch is 5 mm, then the first touch electrode in the embodiment of the present disclosure is 5 mm in length and 2.5 mm in width, and the second touch electrode is 2.5 mm in width.

Optionally, in the touch screen provided by the embodiment of the present disclosure, the second touch electrodes in two adjacent columns are connected with the same vertical scanning line and each second touch electrodes is connected with one vertical scanning line In the touch screen provided by the embodiment of the present disclosure, the number of leads required to be led out is further reduced by connecting two adjacent second touch electrodes to the same vertical scanning line, and thus a narrow bezel design can be easily achieved. Naturally, in other embodiments of the present disclosure, each second touch electrode may also be connected to one vertical scanning line.

In some embodiments, as shown in FIG. 1, the touch screen provided by the embodiment of the present disclosure includes: the first touch electrodes 102 which are block electrodes, the second touch electrodes 104 which are strip electrodes, horizontal scanning lines each of which connects the first touch electrodes 102 in the same row, and vertical scanning lines each of which connects two adjacent second touch electrodes. The horizontal scanning line connects the first touch electrodes 102 in the same row. Specifically, the horizontal scanning line TX1H horizontally connects the first touch electrodes 102 in the first row; the horizontal scanning line TX2H horizontally connects the first touch electrodes 102 in the second row; the horizontal scanning line TX3H horizontally connects the first touch electrodes 102 in the third row; the horizontal scanning line TX4H horizontally connects the first touch electrodes 102 in the fourth row; the horizontal scanning line TX5H horizontally connects the first touch electrodes 102 in the fifth row; and the horizontal scanning line TX6H horizontally connects the first touch electrodes 102 in the sixth row. The horizontal scanning lines TX1H, TX3H and TX5H are led out from the left side of the touch screen, the horizontal scanning lines TX2H, TX4H and TX6H are led out from the right side of the touch screen, so that the number of the leads led out from each side of the touch screen is reduced, and a narrow bezel design can be easily achieved. The vertical scanning line connects two adjacent second touch electrodes, and each second touch electrode is connected with one vertical scanning line. Specifically, the vertical scanning line TX1V connects two adjacent second touch electrodes, the vertical scanning line TX2V connects two adjacent second touch electrodes, and each of the second touch electrodes is connected with one vertical scanning line.

The first and second touch electrode may have the following four position arrangements:

First Arrangement: The first and second touch electrodes are arranged on a common electrode layer. In some embodiments, the first and second touch electrodes may reuse the common electrode layer, dividing the common electrode layer into the structure as shown in FIG. 1. The first touch electrodes are horizontally connected by the horizontal scanning line which may be made of a gate layer metal.

Second Arrangement: The first and second touch electrodes are arranged on a color filter substrate. The first and second touch electrodes form a metal grid on the color filter substrate and are shielded by a black matrix (BM).

Third Arrangement: The first touch electrodes are reused as the common electrode and are arranged on the common electrode layer, and the second touch electrodes are arranged on the color filter substrate.

Fourth Arrangement: The first touch electrodes are arranged on the color filter substrate, and the second touch electrodes are reused as the common electrode and are arranged on the common electrode layer.

Optionally, the touch screen provided by the embodiment of the present disclosure further includes electrode lines each of which corresponds to the first touch electrodes in one column. The electrode line corresponding to the first touch electrodes in any column includes a first sub-electrode line and a second sub-electrode line. The first and second sub-electrode lines are arranged in a column direction at opposite sides of each first touch electrode, and form a mutual capacitor with the first touch electrode when a touch operation has been made.

In some embodiments, as shown in FIG. 1, the touch screen provided by the embodiment of the present application further includes: electrode lines RX1, RX2, RX3, RX4, and RX5, and each of the electrode lines corresponds to the first touch electrodes in one column. Each of the electrode line includes the first and second sub-electrode lines connected with each other, and the first and second sub-electrode lines are arranged in a column direction at opposite sides of the corresponding first touch electrode.

In the touch screen provided by the embodiment of the present application, electrode lines are provided, and thus in a multi-touch, the electrode lines form a mutual capacitor with the first touch electrodes, and the horizontal coordinates of the touch positions are preliminarily determined using the electrode lines, so that the touch positions of the multi-touch are determined and ghost points are eliminated.

Figure 2:
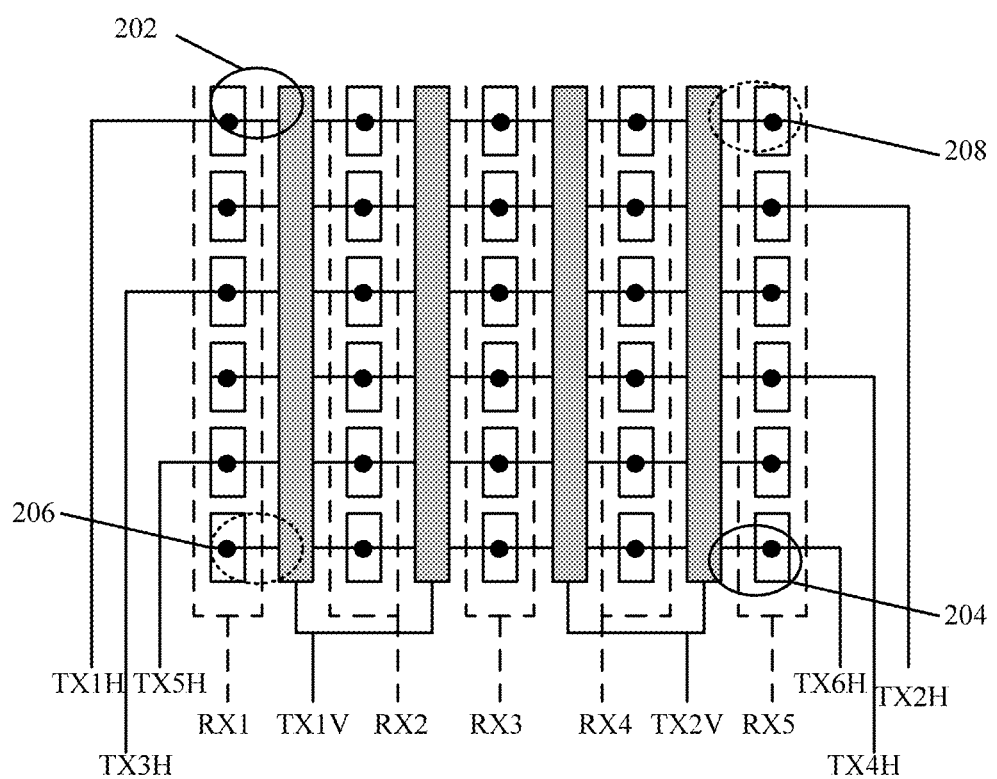
FIG. 2 illustrates a schematic diagram of a method of determining a touch position provided by an embodiment of the present disclosure.

Hereinafter, with reference to FIG. 2, the generation of ghost points in the event of a multi-touch and the principle of eliminating the ghost points by adding the electrode lines in the present disclosure will be described.

Specifically, according to the detection principle of the capacitive touch screen, the vertical coordinate of the touch position is determined by the horizontal scanning line, and the horizontal coordinate of the touch position is determined by the horizontal scanning line. The conventional detection method is to drive and detect the horizontal and vertical scanning lines, and then to determine the touch position based on the vertical coordinate determined by the horizontal scanning line and the horizontal coordinate determined by the vertical scanning line. However, in the event of a multi-touch, as shown in FIG. 2, when the touch positions are in the areas 202 and 204, TX1H, TX6H, TX1V and TX2V all detect touch signals, and thus there may be two more possible coordinate combinations, that is, the areas 206 and 208. However, the actual touch positions are in the areas 202 and 204. Therefore, the areas 206 and 208 determined by combining the coordinates are ghost points.

In the touch screen provided by the embodiment of the present application, in the event of the multi-touch, e.g., the touch positions are in the areas 202 and 204, a driving signal is sequentially applied to the horizontal scanning lines. When the driving signal is applied to the horizontal scanning line TX1H and the horizontal scanning line TX1H detects the touch signal, the vertical coordinate of the touch position is determined to be the vertical coordinate corresponding to the horizontal scanning line TX1H. Meanwhile, when the area 202 is touched, the electrode line RX1 and the first touch electrodes form a mutual capacitor, and thus detection data also exist in the electrode line RX1, thereby preliminarily determining the horizontal coordinate of the touch position (i.e. excluding the touch position as shown in the area 208 in FIG. 2). As such, when the driving signal is applied to the horizontal scanning line TX6H and the horizontal scanning line TX6H detects the touch signal, the vertical coordinate of the touch position is determined to be the vertical coordinate corresponding to the horizontal scanning line TX6H. Meanwhile, when the area 204 is touched, the electrode line RX5 and the first touch electrodes form a mutual capacitor, and thus detection data also exist in the electrode line RX5, thereby preliminarily determining the horizontal coordinate of the touch position (i.e. excluding the touch position as shown in the area 206 in FIG. 2). The driving signal is sequentially applied to the vertical scanning lines, thereby accurately determining the horizontal coordinates of the touch positions. When determining the touch positions, TX1H, TX6H, TX1V and TX2V all detect the touch signals and there may be two possible coordinate combinations, i.e. the areas 202 and 204, and the areas 206 and 208, but the combination of the areas 206 and 208 may be excluded by preliminarily determining the horizontal coordinates of the touch positions using the electrode lines. Therefore, the ultimately determined touch positions are the areas 202 and 204, eliminating the ghost points.

Optionally, in the touch screen provided by the embodiment of the present disclosure, the electrode lines are arranged on the color filter substrate with the width being the same as or smaller than that of the Black Matrix.

Optionally, in the touch screen provided by the embodiment of the present disclosure, the electrode lines are arranged on a source/drain layer and are in the same direction as source and drain electrodes.

Figure 3:
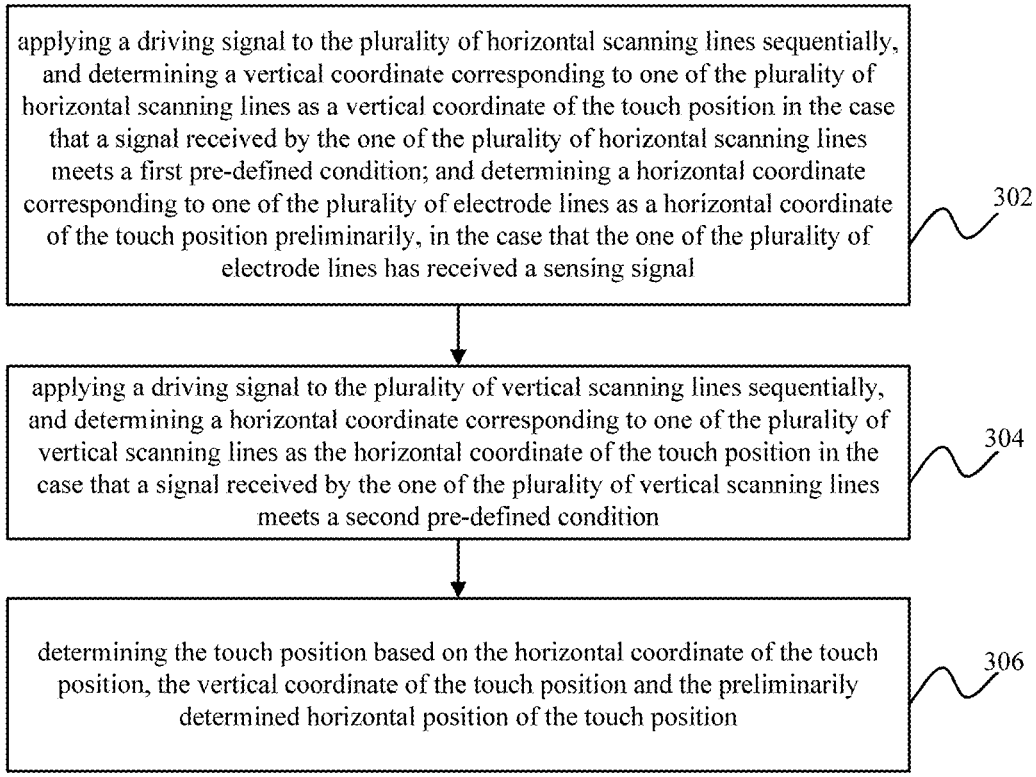
FIG. 3 illustrates a schematic flow chart of a method of determining a touch position provided by an embodiment of the present disclosure.

As shown in FIG. 3, the present disclosure further provides in some embodiments a method of determining a touch position in the touch screen provided by the embodiment of the present disclosure. The method includes the following steps.

Step 302, applying a driving signal to the plurality of horizontal scanning lines sequentially, and determining a vertical coordinate corresponding to one of the plurality of horizontal scanning lines as a vertical coordinate of the touch position in the case that a signal received by the one of the plurality of horizontal scanning lines meets a first pre-defined condition; and determining a horizontal coordinate corresponding to one of the plurality of electrode lines as a horizontal coordinate of the touch position preliminarily, in the case that the one of the plurality of electrode lines has received an induction signal.

Step 304, applying a driving signal to the plurality of vertical scanning lines sequentially, and determining a horizontal coordinate corresponding to one of the plurality of vertical scanning lines as the horizontal coordinate of the touch position in the case that a signal received by the one of the plurality of vertical scanning lines meets a second pre-defined condition.

Step 306, determining the touch position based on the horizontal coordinate of the touch position, the vertical coordinate of the touch position and the preliminarily determined horizontal position of the touch position.

In the method provided by the embodiment of the present disclosure, when sequentially applying the driving signal to the horizontal scanning lines, the horizontal scanning lines and the electrode lines synchronously receive signals. The vertical position of the touch position is determined based on the signal received by the horizontal scanning line, and the horizontal position of the touch position is determined based on the sensing signal received by the electrode line. Then, the driving signal is sequentially applied to the vertical scanning lines, and the horizontal coordinate of the touch position is determined by the signal received by the vertical scanning line, and the touch position is determined based on the horizontal and vertical coordinates of the touch position and the preliminarily determined horizontal coordinate. The horizontal coordinate of the touch position is preliminarily determined by the mutual capacitor formed by the electrode lines and the first touch electrodes, thereby eliminating ghost points in the event of multi-touches. Although the detection of the mutual capacitance is added, there is no increase in the detection time caused by sequentially detecting the self-capacitance and the mutual capacitance. In contrast to sequentially detecting the self-capacitance and the mutual capacitance in the self-capacitor and mutual capacitor integrated touch screen in the related art, the detection of the self-capacitor detection and the detection of the mutual capacitor are synchronously performed, reducing the detection time of the touch position.

It should be noted that although the detection of the mutual capacitance is added in determining the touch position, the detection of the self-capacitance and the detection of the mutual capacitance are synchronously performed. Therefore, the problem of increasing the detection time due to sequentially detecting the self-capacitance and the mutual capacitance does not exist.

Optionally, in the method provided by the method of the present disclosure, for the above-mentioned first pre-defined condition, the delay time of the signal received by the horizontal scanning line is greater than a first preset threshold, and the value of the signal received by the horizontal scanning line is smaller than a second preset threshold. And for second pre-defined condition, the delay time of the signal received by the vertical scanning line is greater than a third preset threshold, and the value of the signal received by the vertical scanning line is smaller than a fourth preset threshold.

It should be understood by those skilled in the art that the application of the driving signal to the horizontal and vertical scanning lines to determine the coordinates of the touch position may adopt methods in the related art and it is not particularly limited herein. The first and third preset thresholds may be set to system default values. For example, the first preset threshold may be 1 millisecond. The second and fourth preset thresholds may be set based on the value of the applied driving signal or adopt system default values. For example, the second preset threshold may be 1 mA.

According to the touch screen and the method of determining the touch position provided by the embodiments of the present disclosure, by connecting the touch electrodes in the same row by the corresponding horizontal scanning line, the number of the leads required to be led out from the touch screen is reduced and the narrow bezel design can be easily achieved; by adding the electrode line to form the mutual capacitor with the first touch electrode, the touch position is accurately determined and the ghost points can be eliminated without increasing the number of scans in the event of multi-touches.

It will be apparent to those skilled in the art that various changes and modifications may be made to this disclosure without departing from the spirit and scope of the present disclosure. Thus, it is intended that the present disclosure encompasses such changes and modifications, if such changes and modifications are within the scope of the claims of the present disclosure and equivalents thereof.

What is claimed is:

1. A touch screen, comprising:
a plurality of first touch electrodes;
a plurality of horizontal scanning lines,
wherein each of the plurality of horizontal scanning lines is connected to the first touch electrodes in a same row,
a plurality of second touch electrodes;
a plurality of vertical scanning lines, each connected to two adjacent second touch electrodes, wherein the second touch electrodes and columns of the first touch electrodes are arranged alternately in a row direction, and
a plurality of electrode lines, each of the plurality of electrode lines corresponding to the first touch electrodes in one column,
wherein each electrode line corresponding to the first touch electrodes in one column comprises a first sub-electrode line and a second sub-electrode line connected with each other, and
the first sub-electrode line and the second sub-electrode line are arranged in a column direction at opposite sides of each first touch electrode and form a mutual capacitor with the first touch electrodes when a touch operation has been made.

2. The touch screen according to claim 1, wherein two adjacent horizontal scanning lines are connected to the first ouch electrodes in different directions.

3. The touch screen according to claim 1, wherein the plurality of first touch electrodes are block electrodes, and there are multiple first touch electrodes in one column, and the plurality of second touch electrodes are strip electrodes, and there is one second touch electrode in one column.

4. The touch screen according to claim 1, wherein two adjacent second touch electrodes are connected with the same vertical scanning line and each second touch electrode is connected with one vertical scanning line.

5. The touch screen according to claim 1, wherein the plurality of first touch electrodes and the plurality of second touch electrodes are arranged on a common electrode layer.

6. The touch screen according to claim 5, wherein
in the case that the plurality of first touch electrodes is arranged on the common electrode layer, the plurality of first touch electrodes is reused as a common electrode;
in the case that the plurality of second touch electrodes is arranged on the common electrode layer, the plurality of second touch electrodes is reused as a common electrode.

7. The touch screen according to claim 1, wherein the plurality of first touch electrodes and the plurality of second touch electrodes are arranged on a color filter substrate.

8. The touch screen according to claim 1, wherein the plurality of first touch electrodes are arranged on a common electrode layer, and the plurality of second touch electrodes are arranged on a color filter substrate; or
the plurality of first touch electrodes are arranged on the color filter substrate, and the plurality of second touch electrodes are arranged on the common electrode layer.

9. The touch screen according to claim 1, wherein the plurality of electrode lines is arranged on a color filter substrate.

10. The touch screen according to claim 1, wherein the plurality of electrode lines is arranged on a source/drain layer, and in a same direction as source and drain electrodes.

11. The touch screen according to claim 1, wherein a length of the first touch electrode is equal to a pre-defined pitch, and a width of the first touch electrode is half of the pre-defined pitch.

12. The touch screen according to claim 1, wherein a width of the second touch electrode is equal to a width of the first touch electrode.

13. A method of determining a touch position in the touch screen according to claim 1, the method comprising:
applying a driving signal to the plurality of horizontal scanning lines sequentially, and determining a vertical coordinate corresponding to one of the plurality of horizontal scanning lines as a vertical coordinate of the touch position in the case that a signal received by the one of the plurality of horizontal scanning lines meets a first pre-defined condition; and determining a horizontal coordinate corresponding to one of the plurality of electrode lines as a horizontal coordinate of the touch position preliminarily, in the case that the one of the plurality of electrode lines has received an induction signal;
applying a driving signal to the plurality of vertical scanning lines sequentially, and determining a horizontal coordinate corresponding to one of the plurality of vertical scanning lines as the horizontal coordinate of the touch position in the case that a signal received by the one of the plurality of vertical scanning lines meets a second pre-defined condition; and
determining the touch position based on the horizontal coordinate of the touch position, the vertical coordinate of the touch position and the preliminarily determined horizontal position of the touch position.

14. The method according to claim 13, wherein,
for the first pre-defined condition, a delay time of the signal received by the one of the plurality of horizontal scanning lines is greater than a first preset threshold, and a value of the signal received by the one of the plurality of horizontal scanning lines is smaller than a second preset threshold, and
for the second pre-defined condition, a delay time of the signal received by the one of the plurality of vertical scanning lines is greater than a third preset threshold, and a value of the signal received by the one of the plurality of vertical scanning lines is smaller than a fourth preset threshold.

* * * * *